O. H. JEWELL.
METHOD OF MAKING ARTIFICIAL ICE.
APPLICATION FILED JUNE 13, 1908.
934,972.
Patented Sept. 21, 1909.
2 SHEETS—SHEET 1.
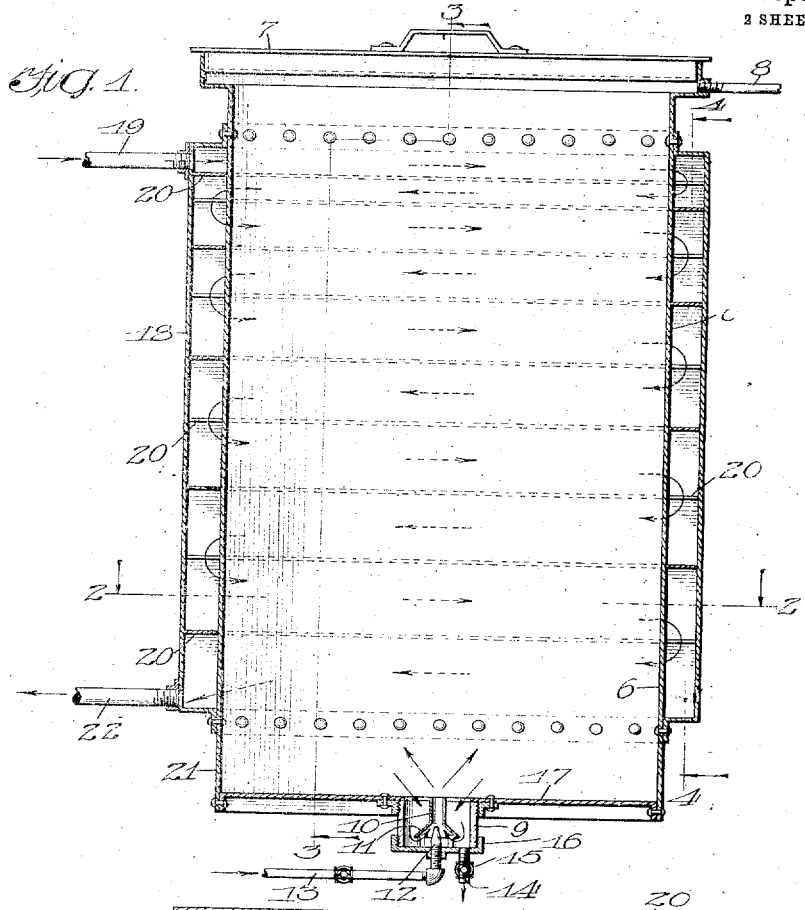
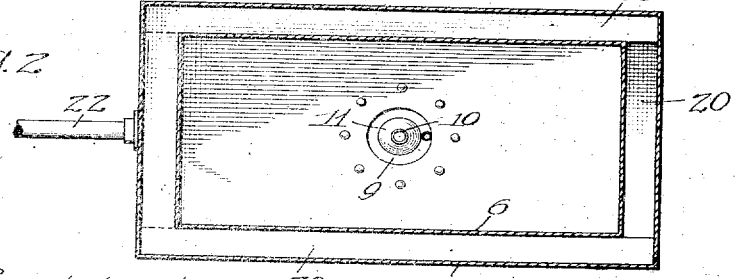

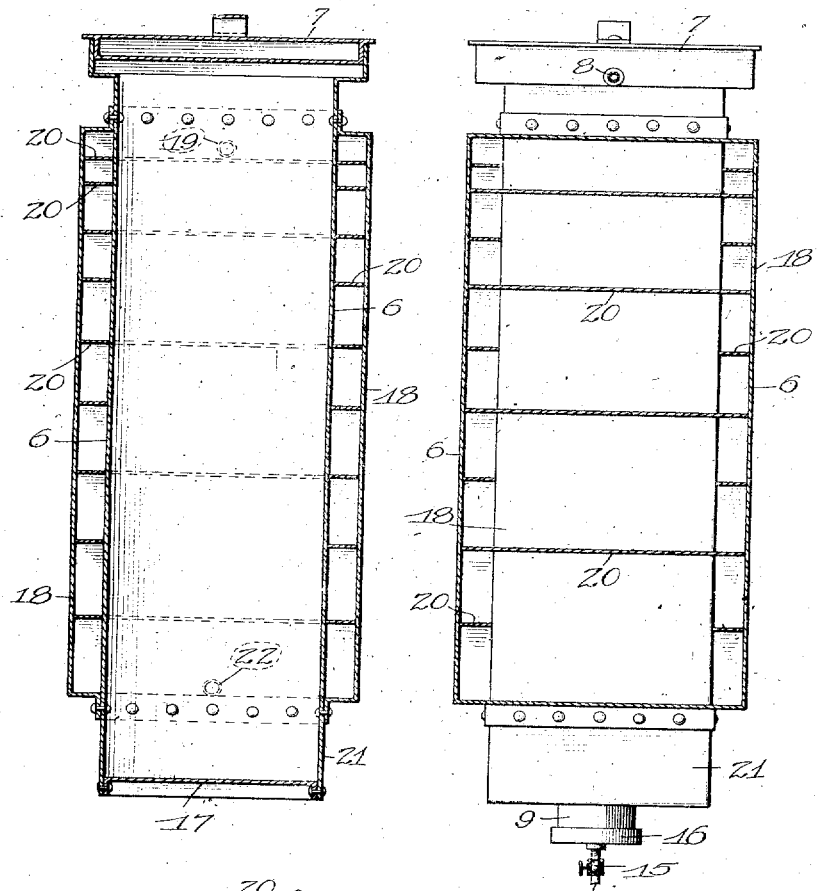

UNITED STATES PATENT OFFICE.

OMAR H. JEWELL, OF CHICAGO, ILLINOIS, ASSIGNOR TO POLAR ICE MACHINE COMPANY, OF CHICAGO, ILLINOIS, A CORPORATION OF ILLINOIS.

METHOD OF MAKING ARTIFICIAL ICE.

934,972.

Specification of Letters Patent. Patented Sept. 21, 1909.

Application filed June 13, 1908. Serial No. 438,373.

*To all whom it may concern:*

Be it known that I, OMAR H. JEWELL, a citizen of the United States, residing at Chicago, in the county of Cook and State of Illinois, have invented a new and useful Method of Making Artificial Ice, of which the following is a specification, reference being had to the accompanying drawings.

My invention relates to the manufacture of artificial ice from raw water—that is to say, water that has not been distilled,—and it has for its object to provide an improved method of treatment, by which the raw water may be frozen expeditiously and economically into a symmetrical block or cake of ice and under such conditions as will result in the formation of crystal ice free from impurities as well as from the usual core formed by the confinement or trapping of air in the center of the ice cake. I accomplish this object as illustrated in the accompanying drawings and as hereinafter described.

What I regard as new is set forth in the claims.

It is recognized by authorities in the art of refrigeration that in the process of freezing water tends to purify itself, expelling not only the impurities held in suspension but also many of the solids held in solution, so that if raw water containing such suspended or dissolved impurities be frozen under conditions such as will permit the impurities so expelled from the forming mass of ice as well as the solids thrown out of solution by the freezing operation to separate and be deposited or removed, the mass of ice when formed will be practically pure. Many attempts have been made by others, as well as by myself, to perfect a method or mode of treatment by which pure crystal ice could be successfully produced from raw water, but for various reasons none of such efforts have proven entirely satisfactory until by the discovery hereinafter described the obstacles heretofore encountered were overcome.

It has heretofore been recognized that by causing the water to be frozen to circulate during the freezing operation the separation of the expelled impurities might be promoted, but, so far as I am aware, no satisfactory process has heretofore been devised for maintaining such circulation of the water. I have discovered, however, that by maintaining a body or zone of unfrozen water below the zone in which the ice is to be formed and introducing air through the unfrozen water to agitate the water to be frozen all the objections incident to prior methods may be avoided. The zone of unfrozen water provides a medium in which solids separated from the water during the freezing operation, as well as the impurities expelled by the forming ice, accumulate and are retained until after the ice is harvested, so that the ice is itself free from such impurities. Furthermore, it also provides a medium through which the air may be constantly introduced during the freezing operation without danger of clogging up the air pipe through the congealing of the moisture contained in the air, thus making it unnecessary to dehydrate the air. This feature of maintaining an unfrozen zone below the freezing zone and initiating in such unfrozen zone a circulatory movement or agitation of the water is characteristic of my invention and constitutes the essence of my discovery. By this method the ice is formed in the upper portion of the receptacle or can, *i. e.* that portion of the can lying within the freezing zone and above the unfrozen zone,—the latter being preferably a simple downward extension of the can below the brine jacket or other means employed to reduce the upper portion of the can to a freezing temperature. The result is that the impurities are gradually collected in the bottom of the can and remain there when the ice is removed.

After the freezing is completed, the ice may be discharged by introducing water into the bottom of the tank and thereby floating the ice so that it rises and may be easily removed.

In the accompanying drawings, in which I have illustrated a simple form of apparatus for carrying out my improved process,—Figure 1 is a longitudinal vertical section of my improved apparatus; Fig. 2 is a cross-section on line 2—2 of Fig. 1; Fig. 3 is a vertical section on line 3—3 of Fig. 1; Fig. 4 is a vertical section on line 4—4 of Fig. 1; and Fig. 5 is a perspective view of one of the baffle-plates or diaphragms which control the direction of flow of the brine.

Referring to the drawings,—6 indicates a tank or receptacle in which is placed the water to be frozen. As shown in Fig. 1, the extreme upper end of said tank is of somewhat greater diameter and is fitted with a cover 7. It is also provided with an overflow pipe 8, as shown in Fig. 1.

9 indicates a well at the bottom of the tank 6, in which is provided a tube 10 having an inverted funnel or flaring portion 11 at its lower end into which projects an injector-nozzle 12 connected to an air-pipe 13. The well 9 is also provided with a drain-pipe 14 having a valve 15, as shown in Fig. 1. Preferably the pipe 10, injector-nozzle 12 and drain-pipe 14 are all carried by a detachable cap or head 16 so that they may be readily removed. The pipe 10 is preferably placed centrally in the well 9, which is centrally disposed relatively to the bottom 17 of the tank. Thus it will be seen that the water in the tank fills the well 9 and that by injecting air into the pipe 10 the water in the well may flow up between the nozzle 12 and the funnel 11, being carried with the incoming air up into the tank, thereby forming a current of water having air intermingled therewith which flows up through the tank and agitates or circulates the water therein. The violence of the movement of the water depends upon the air pressure and ordinarily is sufficient to cause the water in the tank to maintain a pronounced circulation. The pipe 13 is supplied with compressed air from any suitable source of supply.

The tank 6 is surrounded by a jacket 18, except at the extreme upper and lower portions thereof, and said jacket is provided at its upper end with an inlet pipe 19 and at its lower end with an outlet pipe 22, through which brine or other freezing fluid is caused to flow into and out of the jacket and around the tank 6. The brine is cooled by any suitable refrigerating apparatus, such as an ammonia compressor and coils. For the purpose of controlling the flow of brine around the tank 6 the jacket 18 is provided with a series of plates or diaphragms 20 which are preferably of the shape shown in Fig. 5, being, in the construction shown, U-shaped so that they extend across one end and the two sides of the tank 6. The plates are arranged so as to extend alternately in opposite directions, as best shown in Figs. 1 and 4, so that the brine admitted through the pipe 19 is compelled to flow to the opposite end of the tank 6 before it can pass down to the next stratum, flowing back and forth as it progresses downward, as indicated by the arrows in Fig. 1.

It will be noted that the successive plates 20 are set at greater distances apart as the lower portion of the tank is approached, the object being to provide a slower movement of the brine as it becomes warmer.

It will be noted also that the lower portion of the tank 6 extends down a considerable distance below the lower portion of the jacket 18, as shown at 21 in the drawings. This downwardly-extending portion of the tank, being unexposed to the brine, constitutes the non-freezing zone of the can or tank, no ice being formed therein, so that the water in the bottom of the can is always in a fluid condition. This portion of the can also forms a reservoir in which the solids separated from the freezing water, as well as the impurities expelled by the forming ice, gradually accumulate so that they remain separated from the ice and are held in a state of suspension to a greater or less extent by the water contained in the bottom of the can. Furthermore, this unfrozen body of water serves as a medium through which the air admitted to the water to be frozen is introduced without subjecting it to a freezing temperature, thus avoiding the danger of clogging the air pipes by freezing of the moisture naturally contained in the air, as would be the case if the air were introduced directly into water at a low temperature. By this means I also avoid freezing the air pipe into the block of ice, as would be the result if the air pipe were extended into the freezing chamber, and in addition I avoid the use of mechanical devices within the freezing tank or can, which is objectionable for the same reason.

So far as I am aware, I am the first in the art to provide for maintaining a body of unfrozen water in a zone below the forming ice and initiating a circulation or agitation of the water to be frozen in such non-freezing zone either by the introduction of air through the water in such non-freezing zone or by other means, and the claims hereinafter made are, therefore, to be construed accordingly.

That which I claim as my invention, and desire to secure by Letters Patent, is,—

1. The method of making artificial ice, which consists in applying a freezing medium to the upper portion of a suitable receptacle containing the water to be frozen, leaving the lower portion thereof exposed to a non-freezing temperature, and maintaining an unfrozen zone of water at the bottom of the receptacle, and agitating the water in the receptacle during the freezing operation.

2. The method of making artificial ice, which consists in applying a freezing medium to the upper portion of a suitable receptacle containing the water to be frozen, leaving the lower portion thereof exposed to a non-freezing temperature, and maintaining an unfrozen zone of water at the bottom of the receptacle during the freezing operation, and initiating in such unfrozen zone a circulation of the water in the receptacle.

3. The method of making artificial ice, which consists in applying a freezing medium to the upper portion of a suitable receptacle containing the water to be frozen, leaving the lower portion thereof exposed to a non-freezing temperature, and maintaining an unfrozen zone of water at the bottom of the receptacle during the freezing operation, and introducing air into the water in such unfrozen zone to agitate the water in the receptacle.

4. The method of making artificial ice, which consists in applying a freezing medium to the upper portion of a suitable receptacle containing the water to be frozen, leaving the lower portion thereof exposed to a non-freezing temperature, and maintaining an unfrozen zone of water at the bottom of the receptacle during the freezing operation, and admitting air at the bottom of the receptacle to agitate the water therein.

5. The method of making artificial ice, which consists in applying a freezing medium to the upper portion only of a suitable receptacle containing the water to be frozen, and maintaining an unfrozen zone of water in said receptacle below the forming ice during the freezing operation, and agitating the water in the receptacle during the freezing operation.

OMAR H. JEWELL.

Witnesses:
JOHN L. JACKSON,
MINNIE A. HUNTER.

DISCLAIMER.

934,972.—*Omar H. Jewell*, Chicago, Ill. METHOD OF MAKING ARTIFICIAL ICE. Patent dated September 21, 1909. Disclaimer filed May 15, 1913, by the assignee, *Polar Ice Machine Company*.

It hereby makes this disclaimer—

"To that part of the specification which is identified by the word 'either,' line 101, page 2, and the words 'by other means,' line 102, page 2, it being the intent and purpose of this disclaimer to exclude means other than air for effecting the circulation or agitation of the water to be frozen. [*Official Gazette, May 27, 1913.*]

Disclaimer in Letters Patent No. 934,972.

medium to the upper portion of a suitable receptacle containing the water to be frozen, leaving the lower portion thereof exposed to a non-freezing temperature, and maintaining an unfrozen zone of water at the bottom of the receptacle during the freezing operation, and introducing air into the water in such unfrozen zone to agitate the water in the receptacle.

4. The method of making artificial ice, which consists in applying a freezing medium to the upper portion of a suitable receptacle containing the water to be frozen, leaving the lower portion thereof exposed to a non-freezing temperature, and maintaining an unfrozen zone of water at the bottom of the receptacle during the freezing operation, and admitting air at the bottom of the receptacle to agitate the water therein.

5. The method of making artificial ice, which consists in applying a freezing medium to the upper portion only of a suitable receptacle containing the water to be frozen, and maintaining an unfrozen zone of water in said receptacle below the forming ice during the freezing operation, and agitating the water in the receptacle during the freezing operation.

OMAR H. JEWELL.

Witnesses:
JOHN L. JACKSON,
MINNIE A. HUNTER.

DISCLAIMER.

934,972.—*Omar H. Jewell*, Chicago, Ill. METHOD OF MAKING ARTIFICIAL ICE. Patent dated September 21, 1909. Disclaimer filed May 15, 1913, by the assignee, *Polar Ice Machine Company*.

It hereby makes this disclaimer—

"To that part of the specification which is identified by the word 'either,' line 101, page 2, and the words 'by other means,' line 102, page 2, it being the intent and purpose of this disclaimer to exclude means other than air for effecting the circulation or agitation of the water to be frozen. [*Official Gazette, May 27, 1913.*]

DISCLAIMER.

934,972.—*Omar H. Jewell*, Chicago, Ill. METHOD OF MAKING ARTIFICIAL ICE. Patent dated September 21, 1909. Disclaimer filed May 15, 1913, by the assignee, *Polar Ice Machine Company*.

It hereby makes this disclaimer—

"To that part of the specification which is identified by the word 'either,' line 101, page 2, and the words 'by other means,' line 102, page 2, it being the intent and purpose of this disclaimer to exclude means other than air for effecting the circulation or agitation of the water to be frozen. [*Official Gazette, May 27, 1913.*]